United States Patent
Fasulo et al.

(10) Patent No.: US 7,354,967 B2
(45) Date of Patent: Apr. 8, 2008

(54) METHOD FOR MINIMIZING FILLER AGGLOMERATION

(75) Inventors: Paula Diane Fasulo, Eastpointe, MI (US); William R. Rodgers, Sterling Heights, MI (US); Robert Augustine Ottaviani, Anthem, AZ (US); Douglas L. Hunter, Harwood, TX (US)

(73) Assignees: General Motors Corporation, Detroit, MI (US); Southern Clay Products, Inc., Gonzales, TX (US)

( * ) Notice: Subject to any disclaimer, the term of this patent is extended or adjusted under 35 U.S.C. 154(b) by 417 days.

(21) Appl. No.: 10/631,489

(22) Filed: Jul. 31, 2003

(65) Prior Publication Data

US 2005/0027059 A1 Feb. 3, 2005

(51) Int. Cl.
*C08K 3/34* (2006.01)
(52) U.S. Cl. .................... 524/425; 524/445
(58) Field of Classification Search ............. 524/425, 524/445
See application file for complete search history.

(56) References Cited

U.S. PATENT DOCUMENTS

| | | | |
|---|---|---|---|
| 2,531,396 | A | 11/1950 | Carter et al. |
| 5,253,331 | A | 10/1993 | Lorenzen et al. |
| 5,955,535 | A | 9/1999 | Vaia et al. |
| 5,962,553 | A * | 10/1999 | Ellsworth .................. 523/216 |
| 6,225,374 | B1 | 5/2001 | Vaia et al. |
| 6,387,996 | B1 * | 5/2002 | Lan et al. ................... 524/445 |
| 6,417,262 | B1 * | 7/2002 | Turner et al. ............... 524/445 |
| 6,472,460 | B1 | 10/2002 | Okamoto et al. |
| 6,486,253 | B1 * | 11/2002 | Gilmer et al. .............. 524/445 |
| 6,548,587 | B1 * | 4/2003 | Bagrodia et al. ........... 524/445 |
| 6,790,896 | B2 * | 9/2004 | Chaiko ...................... 524/445 |
| 2002/0098309 | A1 * | 7/2002 | Bargrodia et al. ......... 428/36.9 |
| 2002/0119266 | A1 * | 8/2002 | Bagrodia et al. .......... 428/35.7 |
| 2002/0165306 | A1 * | 11/2002 | Gilmer et al. ............. 524/445 |
| 2004/0214921 | A1 * | 10/2004 | Chaiko ...................... 523/200 |

OTHER PUBLICATIONS

Ishida et al., "General Approach to Nanocomposite Preparation," Chem. Mater. 2000, 12, 1260-1267.*
Hasegawa et al., "Preparation and Mechanical Properties of Polypropylene-Clay Hybrids Using a Maleic Anhydride-Modified Polypropylene Oligomer," J. Appl Polym Sci, 67:87-92, 1998.*
Kato, et al., "Synthesis of polypropylene Oligomer-clay Intercalation Compounds," J Appl Polym Sci, 66: 1781-1785, 1997.*
Todd, David B., "Improving Incorporation of Fillers in Plastics. A Special Report," Advances in Polymer Technology, vol. 19, No. 1, pp. 54-63 (2000).*
Lan et al., "Preparation of High Performance Polypropylene Nanocomposites," presented at Additives 2000, Clearwater Beach, FL, Apr. 10-12, 2000, pp. 1-14.*
Fukushima, Y., A. Okada, M. Kawasumi, T. Kurauchi, and O. Kamigaito, Swelling Behaviour of Montmorillonite by Poly-6-Amide, *Clay Minerals*, 23, pp. 27-34 (1988).
Kojima, Y., A. Usuki, M. Kawasumi, A. Okada, T. Kurauchi, and O. Kamigaito, Synthesis of Nylon 6-Clay Hybrid by Montmorillonite Intercalated with ε-Caprolactam, *J. Poly. Sci. A: Polym. Chem.*, 31, pp. 983-986 (1993).
Alexandre, M. and P. Dubois, Polymer-layered Silicate Nanocomposites: Preparation, Properties and Uses of a New Class of Materials, *Matr. Sci. Eng.*, 28, pp. 1-63 (2000).
Kurauchi, T., A. Okada, T. Nomura, T. Nishio, S. Saegusa, and R. Deguchi, Nylon 6-Clay Hybrid—Synthesis, Properties and Application to Automotive Timing Belt Cover, *SAE Technical Paper*, #910584, pp. 1-7 (1991).
Kojima, Y., A. Usuki, M. Kawasumi, A. Okada, Y. Fukushima, T. Kurauchi, and O. Kamigaito, Mechanical Properties of Nylon 6-Clay Hybrid, *J. Mater. Res.*, 8, pp. 1185-1189 (1993).
Shi, H., T. Lan, and T. Pinnavaia, Interfacial Effects on the Reinforcement Properties of Polymer-Organoclay Nanocomposites, *Chem. Mater.*, 8, 1584-1587 (1996).
Laus, M., M. Camerani, M. Lelli, K. Sparnacci, F. Sandrolini, and O. Francescangeli, Hybrid Nanocomposites Based on Polystyrene and a Reactive Organophilic Clay, *J. Mat. Sci.*, 33, pp. 2883-2888 (1998).
Gilman, J. W., Flammability and Thermal Stability Studies of Polymer Layered-Silicate (Clay) Nanocomposites, *Appl. Clay Sci.*, 15, pp. 31-49 (1999).
Fornes, T. D., P. J. Yoon, D. L. Hunter, H. Keskkula, and D. R. Paul, Effect of Organoclay Structure on Nylon 6 Nanocomposite Morphology and Properties, *Polymer*, 43, pp. 5915-5933 (2002).
Liu, L., Z. Qi, and X. Zhu, Studies on Nylon 6/Clay Nanocomposites by Melt-Intercalation Process, *J. Appl. Polym. Sci.*, 71, pp. 1133-1138 (1999).
Cho, J. W. and D. R. Paul, Nylon 6 Nanocomposites by Melt Compounding, *Polymer*, 42, pp. 1083-1094 (2001).

(Continued)

*Primary Examiner*—Kriellion A Sanders

(57) ABSTRACT

A method for minimizing nanofiller agglomeration within a polymeric material includes the step of introducing the nanofiller at predetermined parameters into an extruder having the polymeric material therein. The nanofiller introduction is downstream of the area of the extruder wherein the polymeric material had been substantially melted and mixed. After the nanofiller introduction, the melted polymeric material has the nanofiller dispersed therewithin substantially without agglomerated nanofiller. Then the melted polymeric material having nanofiller dispersed therewithin exits the extruder before nanofiller agglomeration occurs.

25 Claims, 3 Drawing Sheets

OTHER PUBLICATIONS

Wang, H., C. Zeng, M. Elkovitch, L. J. Lee, and K. W. Koelling, Processing and Properties of Polymeric Nano-Composites, *Polym. Eng. Sci.*, 41, pp. 2036-2046 (2001).

Vaia, R. A., H. Ishii, and E. P. Giannelis, Syntehsis and Properties of Two-Dimensional Nanostructures by Direct Intercalation of Polymer Melts in Layered Silicates, *Chem. Mater.*, 5, pp. 1694-1696 (1993).

Hoffmann, B., C. Dietrich, R. Thomann, C. Friedrich, and R. Mulhaupt, Morphology and Rheology of Polystyrene Nanocomposites Based Upon Organoclay, *Macromol. Rapid Commun.*, 21, pp. 57-61 (2000).

Kawasumi, M., N. Hasehawa, M. Kato, A. Usuki, and A. Okada, Preparation and Mechanical Properties of Polypropylene-Clay Hybrids, *Macromolecules*, 30, pp. 6333-6338 (1997).

Reichert, P., H. Nitz, S. Klinke, R. Brandsch, R. Thomann, and R. Mulhaupt, Poly(propylene)/Organoclay Nanocomposite Formation: Influence of Compatibilizer Funtionality and Organoclay Modification, *Macromol. Mater. Eng.*, 275, pp. 8-17 (2000).

Dennis, H. R., D. L. Hunter, D. Chang, S. Kim, J. L. White, J. W. Cho, and D. R. Paul, Effect of Melt Processing Conditions on the Extent of Exfoliation in Organoclay-Based Nanocomposites, *Polymer*, 42, pp. 9513-9522 (2001).

Andersen, P. G., Twin Screw Extrusion Guidelines for Compounding Nanocomposites, *SPE Antec 2002-Proceedings of the 60th Annual Technical Conference and Exhibition*, May 5-9, 2002, San Francisco, California.

P. G. Andersen, The Werner and Pfleiderer Twin-Screw Corotating Extruder System, *Plastics Compounding*, Ch. 4, pp. 72-124 (1998).

Okada, A., M. Kawasumi, T. Kurauchi, and O. Kamigaito, Synthesis and Characterization of a Nylon 6-Clay Hybrid, *Polymer Preprints*, 28, pp. 447-448 (1987).

\* cited by examiner

METHOD FOR MINIMIZING FILLER AGGLOMERATION

TECHNICAL FIELD

The present invention relates generally to nanocomposites, and more particularly to processing of nanocomposites.

BACKGROUND OF THE INVENTION

Nanotechnology can be defined as materials or devices engineered at the molecular level. Within this category are polymer nanocomposites, which are a class of materials that use molecular sized particles for reinforcing the polymer matrix, e.g. the reinforcing filler possesses one or more dimensions on a sub-micrometer scale. These materials blend an organoclay with polymer to produce a composite with equal or better physical and mechanical properties than their conventionally filled counterparts but at lower filler loadings.

Due to the surface area available with nano-fillers, polymer nanocomposites offer the potential for enhanced mechanical properties, barrier properties, thermal properties, and flame retardant properties when compared to conventionally filled materials.

One class of polymer nanocomposites uses a filler material that is based on the smectite class of aluminum silicate clays, a common representative of which is montmorillonite. Although naturally occurring and synthetic variations of this basic mineral structure can be used to make nanocomposites, the structure must allow the exchange of interlayer inorganic cations, such as $Na^+$ or $Ca^{2+}$, with organic cations, such as alkylammonium cations, if property enhancements are to be achieved. This replacement increases the spacing between the silicate sheets as well as improves the compatibility of the filler and the resin system, thereby facilitating exfoliation.

Recently, researchers have been investigating melt processing as a method for the preparation of nanocomposites for polyamide (nylon) and other thermoplastic systems such as polystyrene and polypropylene. These researchers have primarily been interested in the effect of the processing conditions on the physical and mechanical property enhancement or on the dispersion of the nanofiller as measured by transmission electron microscopy or x-ray diffraction. While these techniques are useful for evaluation on the sub-micrometer scale, little is found in the literature concerning the investigation of the dispersion of the nanofiller on a sub-millimeter scale, ie. a length scale that is on the edge of visual perception.

During processing of nanocomposite materials, it has been found that compaction of the nanofiller materials may occur. This agglomeration of the filler may affect the final properties of the composite by lowering the effective filler concentration and by the creation of stress risers around these agglomerates. Agglomerated filler further may cause an aesthetically displeasing surface. One example of a displeasing surface is shown in comparative FIG. 5.

SUMMARY OF THE INVENTION

The present invention substantially solves the drawbacks enumerated above by providing a method for minimizing nanofiller agglomeration within a polymeric material which includes the step of introducing the nanofiller at predetermined parameters into an extruder having the polymeric material therein. The nanofiller introduction is downstream of the area of the extruder wherein the polymeric material had been substantially melted and mixed. After the nanofiller introduction, the melted polymeric material has the nanofiller dispersed therewithin substantially without agglomerated nanofiller. Then the melted polymeric material having nanofiller dispersed therewithin exits the extruder before nanofiller agglomeration occurs.

BRIEF DESCRIPTION OF THE DRAWINGS

Objects, features and advantages of embodiments of the present invention may become apparent upon reference to the following detailed description and drawings, in which.

DESCRIPTION OF THE PREFERRED EMBODIMENTS

Figure 5:
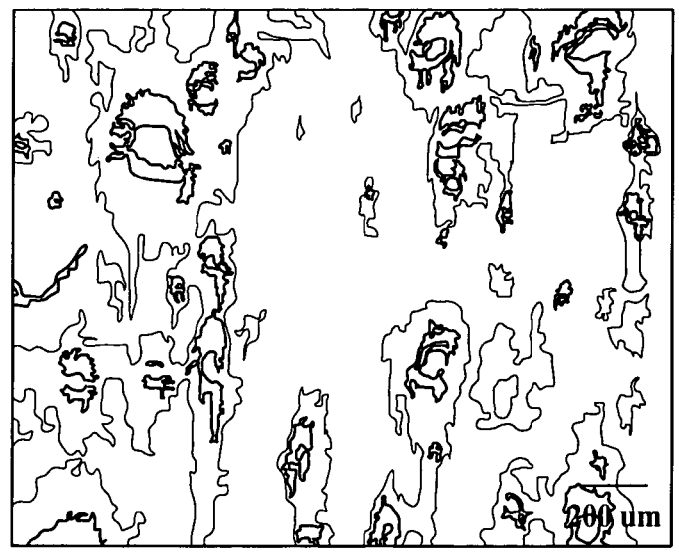
FIG. 5 is a schematic diagram of a micrograph showing a representative "rank 5" surface.

The present invention is predicated upon the unexpected and fortuitous discovery that, if nanofiller is fed downstream in an extruder, into molten polymers which have already been mixed, nanofiller agglomeration is substantially minimized, and in some cases may be substantially eliminated. This is advantageous in that nanofiller agglomeration is a cause of undesirable surface finishes (FIG. 5 is a comparative example of one such undesirable surface finish). It has further been fortuitously discovered that, agglomeration of nanofiller may be substantially prevented if the nanocomposite (polymer(s) plus nanofiller) formed as set out hereinabove is kept in the extruder substantially the shortest amount of time necessary (less time than conventionally remaining in the extruder) after the nanofiller addition, before the nanofiller has an opportunity to agglomerate to a substantial degree. It is to be understood herein that a small amount of agglomeration may occur without deleteriously affecting the surface finish of a subsequently formed part/article.

Figure 1:
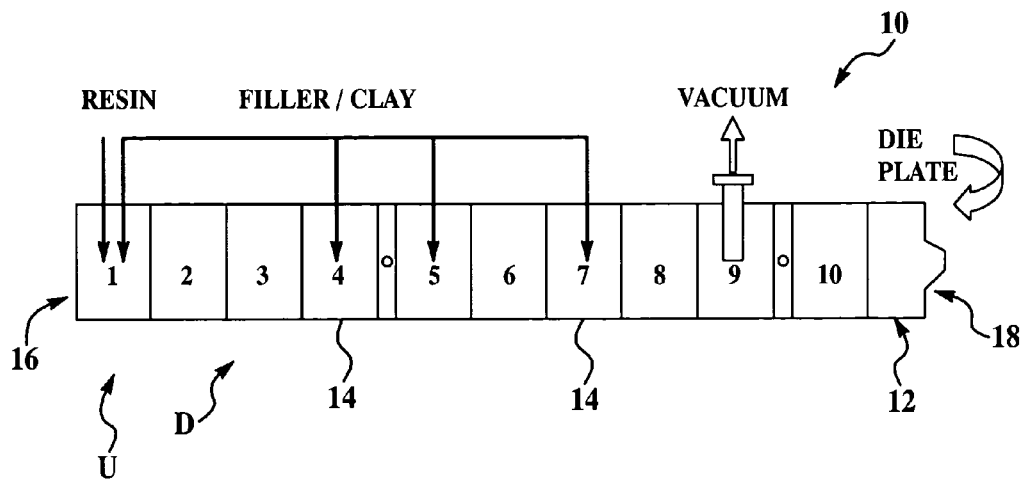
FIG. 1 is a schematic diagram showing an extruder and some steps of embodiments of the present invention.

The addition of nanofiller downstream is in sharp contrast to conventional processing wherein nanofiller is added upstream (e.g. in barrel "1" as shown in FIG. 1 by the filler addition arrow adjacent the resin addition arrow) along with the polymeric material/resins.

Referring now to FIG. 1, the method for minimizing nanofiller agglomeration within a polymeric material according to an embodiment of the present invention includes the following steps. A schematic representation of an apparatus and some of the method steps according to embodiments of the present invention is shown in FIG. 1. Polymeric material (denoted generally as "resin" in FIG. 1) is introduced into an extruder 10 having an entrance 16 and an exit 18. Extruder 10 has a plurality of barrels/cylinders 14 in fluid communication with a screw 12 (shown schematically) rotating therewithin. Generally, the barrel 14 adjacent the entrance 16 is considered upstream U, for example, barrel "1." (The number designations within quote marks are reflected in FIG. 1.) Some of the plurality of barrels 14 adjacent the upstream barrels 14 are considered downstream D, for example from about barrel "2" to about barrel "7." The polymeric material/resin introduction is via the upstream U barrel "1."

The method according to embodiments of the present invention further includes substantially melting and mixing the polymeric material within the extruder 10. The polymeric material generally moves downstream D during the melting and mixing. During the melting and mixing, the polymeric materials (such as resins) are mixed, with elastomers substantially well dispersed therein. The nanofiller is then introduced at predetermined extrusion processing parameters into the extruder 10, the nanofiller introducing being downstream D of the polymeric material introduction. After the nanofiller introduction into the extruder 10, the melted polymeric material has the nanofiller dispersed therewithin (now a nanocomposite material) substantially without agglomerated nanofiller.

The method according to embodiments of the present invention further includes causing the melted polymeric material having nanofiller dispersed therewithin (nanocomposite) to exit the extruder 10 before substantial nanofiller agglomeration occurs. As stated hereinabove, the nanocomposite (polymer(s) plus nanofiller) is kept in the extruder 10 substantially the shortest amount of time necessary (less time than conventionally remaining in the extruder 10) after the nanofiller addition, before the nanofiller has an opportunity to agglomerate to a substantial degree.

It is to be understood that the predetermined extrusion processing parameters may include at least one of temperature, feed rate (of the polymeric material, the nanofiller being a percentage thereof), and screw rotation speed.

It is to be further understood that the polymeric material may include any suitable thermoplastic olefins (TPOs). In an embodiment, the TPOs include, but are not limited to at least one of polypropylenes, polyethylenes, elastomers, impact copolymers thereof, and mixtures thereof. In an alternate embodiment, the polymeric material includes at least one of polypropylene homopolymer, impact modified polypropylene, ethylenepropylene elastomers, and mixtures thereof.

It is to be understood that the nanofiller may be any suitable nanofiller. In an embodiment of the present invention, the nanofiller is a clay which is includes, but is not limited to at least one of smectite, hectorite, montmorillonite, bentonite, beidelite, saponite, stevensite, sauconite, nontronite, and mixtures thereof. In an alternate embodiment, the nanofiller is an aluminum silicate smectite clay. Alternately, the nanofiller comprises organically modified montmorillonite.

It is to be understood that the processing temperature may be in any suitable range. In an embodiment, the temperature may range between about 180° C. and about 230° C. Alternately, the temperature may range between about 220° C. and about 230° C. In a further embodiment, the temperature may range between about 180° C. and about 185° C. Further, in an embodiment, the temperature is about 180° C.

Further, it is to be understood that the feed rate may be in any suitable range. In an embodiment, the feed rate may range between about 80 lbs/hour and about 130 lbs/hour. Alternately, the feed rate may fall within the following ranges: between about 85 lbs/hour and about 115 lbs/hour; between about 80 lbs/hour and about 130 lbs/hour; between about 80 lbs/hour and about 125 lbs/hour; and between about 80 lbs/hour and about 135 lbs/hour. In an embodiment, the feed rate is about 80 lbs/hour.

It is to be understood that the screw rotation speed may be any suitable speed. In an embodiment of the present invention, the screw rotation speed ranges between about 360 rpm and about 480 rpm. In an alternate embodiment, the screw rotation speed is about 480 rpm.

In an embodiment of the present invention, the screw 12 has a first profile adjacent the area U wherein the polymeric material is mixed, and a second profile downstream D, the first screw profile being more aggressive than the second screw profile. It is to be understood that less "aggressive" as defined herein is contemplated as meaning less intense elements, and a shorter mixing section upstream U. More "aggressive" as defined herein is contemplated as meaning more (as compared to the less "aggressive" definition) intense elements, and a longer mixing section upstream U. The most "aggressive" as defined herein is contemplated as meaning the most (as compared to the more "aggressive" definition) intense mixing elements, and the longest mixing section upstream U.

Although it is to be understood that nanofiller introduction may be accomplished by any suitable means, in an embodiment of the present invention, the nanofiller introduction is achieved via a smooth gravity stream, as opposed to pulsating.

It has advantageously been found that, the more downstream the nanofiller addition, the more the processing parameters may vary while still minimizing agglomeration and producing parts having aesthetically pleasing surface finishes (FIG. 4) and enhanced physical properties.

Figure 4:
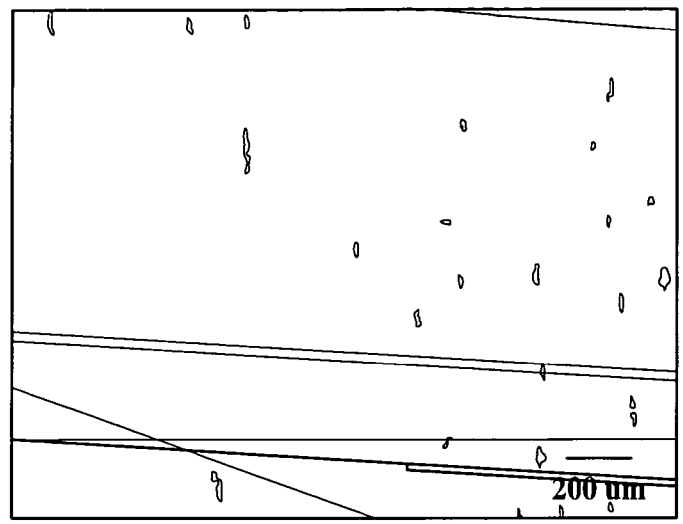
FIG. 4 is a schematic diagram of a micrograph showing a representative "rank 1" surface.

The present invention further includes a molded nanocomposite article, a surface of which is shown in FIG. 4, wherein the polymeric material having nanofiller dispersed therein (nanocomposite material) from which the article is molded is made by embodiment(s) of the method of the present invention. The nanocomposite article has a substantially smooth surface finish and enhanced physical properties.

EXAMPLES

Extrusion trials were run to determine the role of the processing conditions with regard to the dispersion of nanoclay based filler systems in thermoplastic olefin resin systems. All the formulations were extruded on a fully intermeshing twin-screw extruder.

The thermoplastic olefin (TPO) resins used were comprised of a mechanical blend of polypropylene homopolymer, impact modified polypropylene and ethylene-propylene based elastomers. The resins were used as received without further purification.

The nanofiller used was organically modified montmorillonite fillers. The montmorillonite for these fillers was refined from Wyoming bentonite clay and was modified using an ammonium based surfactant.

The processing parameters of melt temperature, feed rate, and extruder screw rotation speed were evaluated.

All formulations were injection molded using identical conditions into 4×6 inch side-gated plaques using a Van Dorn 120 ton injection molding press, and then painted.

Evaluation—Surface Appearance

Visual Ranking. Each formulation was ranked by viewing a sample panel under fluorescent north-sky light (color temperature of 7500° K.) and incandescent spotlights. The surface imperfections were used to track the amount of clay compaction. A distributive rank was given for each formulation based on the visual observation of the unpainted panels. Panels were ranked from 1 to 5 with 1 being the best and 5 the worst.

Controls. An unfilled formulation using the same resin combination as with the filled materials was prepared using the conditions of low melt temperature, low feed rate, and high screw rotation speed. This control sample was prepared in order to determine if surface imperfections observed on the painted plaques were merely consequences of the painting operation or a result of the surface imperfections from the as molded plaque reading through the paint layers.

Microscopy. Micrographs were taken of the surfaces to assist with the correlation of the size of the imperfections with the ease of visual observation. An Olympus stereo optical microscope (Model SZH) was used to observe the surfaces of all the formulations. Micrographs were taken at 64× in order to image the surface.

Evaluation—Physical and Mechanical Properties

Flexural Modulus. The flexural modulus was measured using injection-molded samples according to the standard ISO test methods. Five molded samples were measured for each formulation.

Shrinkage. The shrinkage was measured 48 hours after molding. It was measured in two dimensions (length and width). The formulas are:

(mold length−sample length)/(mold length×1000)

(mold width−sample width)/(mold width×1000).

The units for shrinkage are mm/M. The composite shrinkage was calculated by averaging the shrinkage in the length and width directions. Shrinkage was also measured after a simulated paint bake (1 hour at 125° C.).

Other Properties. The melt flow rate, weight percent inorganic content, density, tensile strength at yield, and heat distortion temperature were measured according to the standard ISO test methods.

Results and Discussion

Figure 3A:
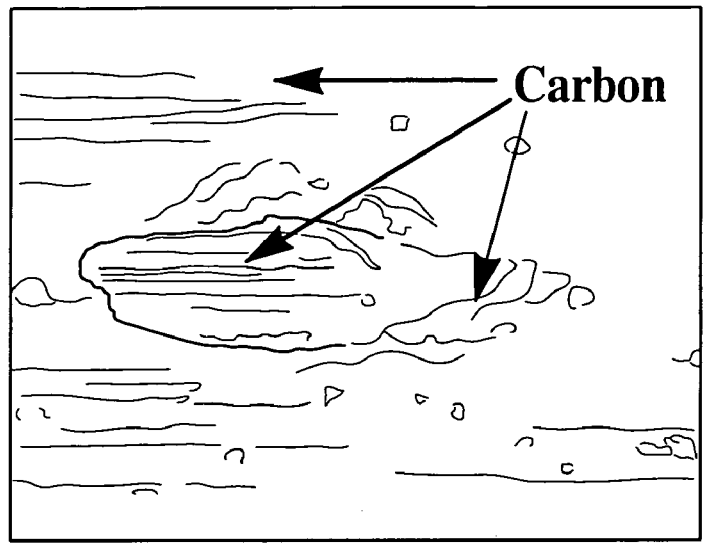
FIG. 3A is a schematic diagram of a SEM of the surface showing a surface imperfection at ×500 magnification.
Figure 3B:
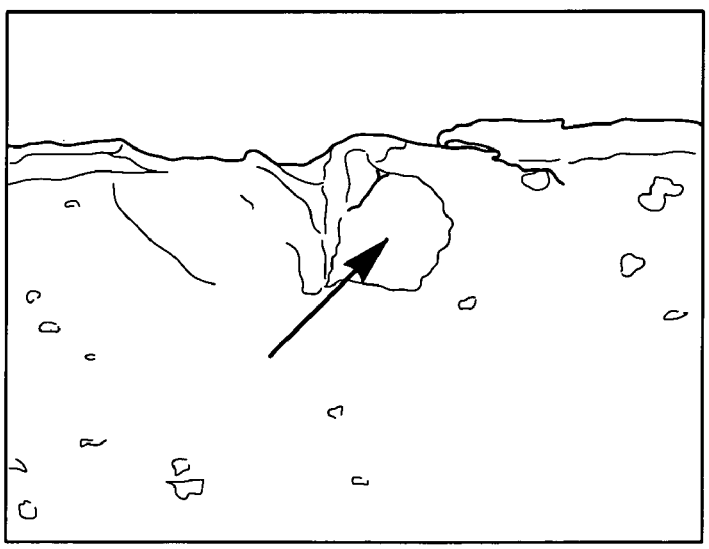
FIG. 3B is a schematic diagram of a SEM at ×200 magnification showing a cross-section of the surface imperfection of FIG. 3A, with the arrow pointing to filler.

To begin, retained samples were examined from over 300 varying nanocomposite formulations. On slightly less than half, some surface imperfections were observed. To determine what these imperfections were, scanning electron microscopy (SEM) and energy dispersive x-ray spectroscopy (EDS) analysis was undertaken on the surfaces and cross-sections of these retained plaques. FIGS. 3A and 3B show micrographs of an imperfection. EDS analysis of the surface shows that it was entirely composed of carbons and hydrogens attributable to the polymer resins. FIG. 3B shows the cross-section of this area. Directly under the imperfection, a clump of material is observed that EDS identified as silicon and aluminum (filler-shown by the arrow).

It was determined that clay agglomerations can be formed during the conventional extrusion process. The method according to embodiments of the present invention minimizes (if not substantially eliminates) the creation of these agglomerates so that exfoliation of the filler is substantially maximized.

Designed Experiment Evaluation

Visual Rank/Microscopy. Both visual and microscopic examination of surfaces was used to determine the degree of filler agglomeration, but the visual examination was used in determining the rank. This was done because it is desirable that the surfaces finishes be aesthetically pleasing. Rankings were done on a 5-point scale with 1 being the best and 5 being the worst. Rankings of 1 and 2 were considered acceptable as imperfections were non-existent or very small, were not visible to the unaided eye, and were not considered to present issues with painted parts. Rankings of 3 to 5 were considered unacceptable as the population or size of imperfections was large enough for the imperfections to be visually observed. Imperfections of this severity were considered capable of reading through paint and creating an unacceptable painted surface.

Although the panels were visually ranked, micrographs were taken in order to confirm the visual rankings and to be able to show comparisons between panels. These micrographs are shown in FIGS. 4 and 5. The micrograph in FIG. 4 is of the surface from a sample that had a rank of 1. It shows no imperfections. As the population of imperfections becomes higher, the ranks increase from 2 to 5. For the formulations with ranks of 2 and some of the samples ranked 3, no defects could be seen visually unpainted or painted. For the remaining formulations with a rank of 3 and all formulations with a rank of 4 or 5 (the micrograph of FIG. 5 had a rank of 5—in the process that produced the nanocomposite of FIG. 5, the nanofiller had been added upstream in barrel "1" along with the resins/elastomers), defects could be visually observed on both the unpainted and painted plaques.

Designed Experiment—Simple Analysis

In general, experiments showed that the trend is for the ranks to improve as the feed rate decreases. Further, ranks generally improved with higher screw rotation speed. However, no clear trend was apparent regarding processing temperatures.

Figure 2:
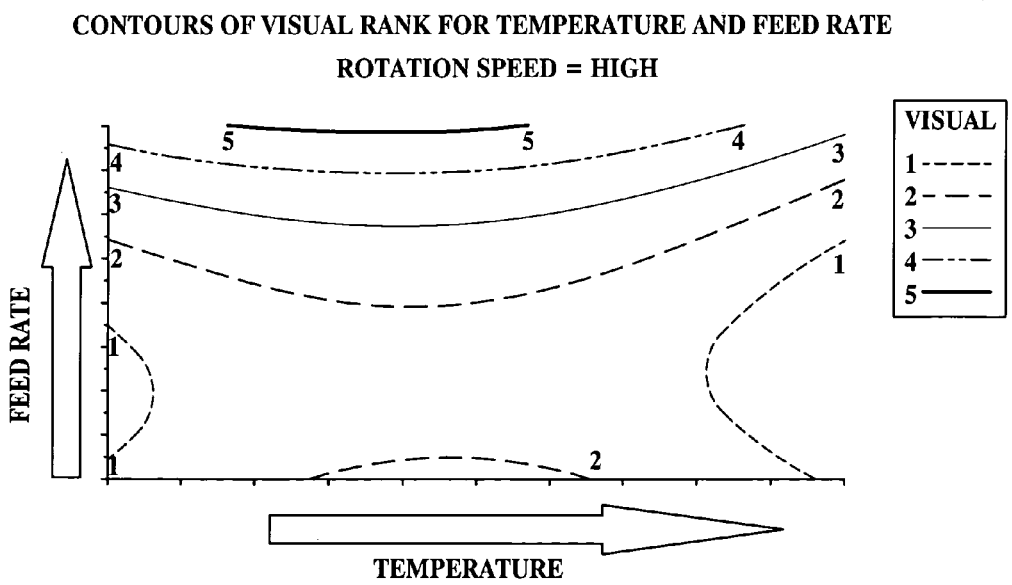
FIG. 2 is a contour diagram showing projected effects of processing parameters on surface finishes of molded articles.

Contour Diagrams. To take the previous analysis further, the results from the designed experiments were used to generate contour diagrams (the contour diagram shows projected, not actual results) that defined some optimal operating windows. FIG. 2 is a contour diagram in which the feed rate is plotted against the temperature while holding the screw rotation speed constant at high rpm. With these conditions, a rank of 1 (best) is achieved. The rank of the panels appears to be relatively independent of the processing temperature, although there is an indication that either low or high temperatures may provide improved rankings.

Painted Plaques

On the painted panels, no imperfections could be seen on plaques that had a distributive rank of 1 or 2 (unpainted) and on some of those with a rank of 3. Some of the panels with ranks of 3 and all of the panels ranked 4 and 5 exhibited surface imperfections after painting.

The control panels were prepared mainly so that commonly occurring paint imperfections would not be confused with a read-through from the imperfections caused by the clay agglomeration. From our data, it appears that imperfections smaller than 50 μm did not lead to post-paint surface imperfections.

This work has shown that the method according to embodiments of the present invention substantially minimizes nanofiller agglomeration. Without being bound to any theory, it is believed that the clay may agglomerate when the processing temperature is higher because there is more chance of degrading the intercalant or surfactant that exists between the clay sheets prior to the filler being wetted by the molten resin. Without this material, the surface tension of the unmodified clay sheets may lead to agglomeration. When the feed rate is high, it is believed that there may be a greater chance of forming a mass of clay that can then experience increased pressure as it is processed in the extruder thereby creating agglomerates. It is further believed that a low screw rotation speed imparts less energy to the clay sheets leading to slower reduction in the breakdown in the height of the clay stacks, which in turn may slow the exfoliation of the filler material.

While several embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

The invention claimed is:

1. A method for minimizing nanofiller agglomeration within a polymeric material, the method comprising the steps of:
    introducing, via a smooth gravity stream, the nanofiller at predetermined extrusion processing parameters into an extruder having the polymeric material therein, the introducing being downstream of an area of the extruder wherein the polymeric material had been substantially melted and mixed, wherein after the nanofiller introduction into the extruder, the melted polymeric material has the nanofiller dispersed therewithin substantially without agglomerated nanofiller, wherein the polymeric material includes a thermoplastic olefin, and wherein the nanofiller includes a smectite clay selected from hectorite, montmorillonite, bentonite, beidelite, saponite, stevensite, sauconite, nontronite, and mixtures thereof; and
    causing the melted polymeric material having nanofiller dispersed therewithin to exit the extruder before substantial nanofiller agglomeration occurs.

2. The method as defined in claim 1 wherein the extruder has a screw rotating therein, and wherein the predetermined parameters are selected from temperature, feed rate, screw rotation speed, and combinations thereof.

3. The method as defined in claim 1 wherein the thermoplastic olefin is selected from polypropylenes, polyethylenes, elastomers, impact copolymers thereof, and mixtures thereof.

4. The method as defined in claim 2 wherein the temperature ranges between about 180° C. and about 230° C.

5. The method as defined in claim 2 wherein the feed rate ranges between about 80 lbs/hour and about 130 lbs/hour.

6. The method as defined in claim 2 wherein the screw rotation speed ranges between about 360 rpm and about 480 rpm.

7. The method as defined in claim 2 wherein the screw has a first profile adjacent the area wherein the polymeric material is mixed, and a second profile downstream, and wherein the first screw profile is more aggressive than the second screw profile.

8. The method as defined in claim 1 wherein the thermoplastic olefin is selected from polypropylene homopolymer, impact modified polypropylene, ethylene-propylene elastomers, and mixtures thereof.

9. The method as defined in claim 1 wherein the nanofiller is an aluminum silicate smectite clay.

10. The method as defined in claim 2 wherein the temperature ranges between about 180° C. and about 185° C., the feed rate ranges between about 85 lbs/hour and about 115 lbs/hour, and the screw rotation speed is about 480 rpm.

11. The method as defined in claim 10 wherein the temperature is about 180° C., the feed rate is about 80 lbs/hour, and the screw rotation speed is about 480 rpm.

12. The method as defined in claim 2 wherein the temperature ranges between about 220° C. and about 230° C.,
the feed rate ranges between about 80 lbs/hour and about 130 lbs/hour, and the screw rotation speed is about 480 rpm.

13. The method as defined in claim 2 wherein the temperature ranges between about 180° C. and about 185° C., the feed rate ranges between about 80 lbs/hour and about 125 lbs/hour, and the screw rotation speed is about 360 rpm.

14. The method as defined in claim 2 wherein the temperature ranges between about 220° C. and about 230° C., the feed rate ranges between about 80 lbs/hour and about 135 lbs/hour, and the screw rotation speed is about 360 rpm.

15. A method for minimizing nanofiller agglomeration within a polymeric material, the method comprising the steps of:
    introducing the polymeric material into an extruder having an entrance, and having a plurality of barrels in fluid communication with a screw rotating therewithin, some of the plurality of barrels adjacent the entrance being upstream, and same of the plurality of barrels adjacent the upstream barrels being downstream, wherein the polymeric material introduction is via at least one of the upstream barrels, and wherein the polymeric material is a thermoplastic olefin;
    substantially melting and mixing the polymeric material within the extruder, the polymeric material generally moving downstream during the melting and mixing;
    then introducing, via a smooth gravity stream, the nanofiller at predetermined extrusion processing parameters into the extruder, the nanofiller introducing being downstream of the polymeric material introduction, wherein the nanofiller includes a smectite clay selected from hectorite, montmorillonite, bentonite, beidelite, saponite, stevensite, sauconite, nontronite, and mixtures thereof, and wherein after the nanofiller introduction into the extruder, the melted polymeric material has the nanofiller dispersed therewithin substantially without agglomerated nanofiller; and
    causing the melted polymeric material having nanofiller dispersed therewithin to exit the extruder before substantial nanofiller agglomeration occurs.

16. The method as defined in claim 15 wherein the predetermined parameters are selected from temperature, feed rate, screw rotation speed, and combinations thereof.

17. The method as defined in claim 15 wherein the temperature ranges between about 180° C. and about 230° C., wherein the feed rate ranges between about 80 lbs/hour and about 130 lbs/hour, and wherein the screw rotation speed ranges between about 360 rpm and about 480 rpm.

18. The method as defined in claim 15 wherein the screw has a first profile upstream for the polymeric material mixing) and a second profile downstream, and wherein the first screw profile is more aggressive than the second screw profile.

19. The method as defined in claim 15 wherein the nanofiller comprises organically modified montmorillonite.

20. The method as defined in claim 17 wherein the temperature ranges between about 180° C. and about 180° C., the feed rate ranges between about 85 lbs/hour and about 115 lbs/hour, and the screw rotation speed is about 480 rpm.

21. A method for minimizing nanofiller agglomeration within a polymeric material comprising thermoplastic olefins, the method comprising the steps of:
    introducing the polymeric material into an extruder having an entrance, and having a plurality of barrels in fluid communication with a screw rotating therewithin, some of the plurality of barrels adjacent the entrance being upstream, and some of the plurality of barrels adjacent the upstream barrels being downstream, wherein the polymeric material introduction is via at least one of the upstream barrels;

substantially melting and mixing the polymeric material within the extruder, the polymeric material generally moving downstream during the melting and mixing;

then introducing, via a smooth gravity stream, the nanofiller comprising aluminum silicate smectite clays at predetermined extrusion processing parameters into the extruder, the nanofiller introducing being downstream of the polymeric material introduction, wherein after the nanofiller introduction into the extruder, the melted polymeric material has the nanofiller dispersed therewithin substantially without agglomerated nanofiller, wherein the predetermined parameters comprise at least one of temperature, feed rate, and screw rotation speed, and wherein the screw has a first profile upstream for the polymeric material mixing, and a second profile downstream, and wherein the first screw profile is more aggressive than the second screw profile; and causing the melted polymeric material having nanofiller dispersed therewithin to exit the extruder before substantial nanofiller agglomeration occurs.

22. The method as defined in claim 21 wherein the temperature is about 180° C., the feed rate is about 80 lbs/hour, and the screw rotation speed is about 480 rpm.

23. A molded nanocomposite article, wherein a polymeric material from which the article is molded is made by the method of claim 1, and wherein the nanocomposite article has a substantially smooth surface finish.

24. A method for minimizing nanofiller agglomeration within a polymeric material, the method comprising the steps of:

introducing, via a smooth gravity stream, the nanofiller at predetermined extrusion processing parameters into an extruder having the polymeric material therein, the introducing being downstream of an area of the extruder wherein the polymeric material had been substantially melted and mixed, wherein after the nanofiller introduction into the extruder, the melted polymeric material has the nanofiller dispersed therewithin substantially without agglomerated nanofiller, wherein the polymeric material includes a mechanical blend of polypropylene homopolymer, impact modified polypropylene, and ethylene-propylene based elastomers, and wherein the nanofiller includes an organically modified montmorillonite; and causing the melted polymeric material having nanofiller dispersed therewithin to exit the extruder before substantial nanofiller agglomeration occurs.

25. The method as defined in claim 24 wherein the organically modified montmorillonite is a bentonite clay modified with an ammonium based surfactant.

* * * * *